Feb. 9, 1960 D. L. ELAM Re. 24,779

ELECTRICAL SENSING APPARATUS

Original Filed Jan. 11, 1955 2 Sheets-Sheet 1

Inventor
David L. Elam
By
Hoffgren, Brady, Wegner, Allen & Stellman
Attorneys

ELECTRICAL SENSING APPARATUS

Original Filed Jan. 11, 1955 2 Sheets-Sheet 2

Inventor
David L. Elam
By Hoffgren, Brody, Wegner, Allen & Stellman Attorneys

United States Patent Office

Re. 24,779
Reissued Feb. 9, 1960

24,779

ELECTRICAL SENSING APPARATUS

David L. Elam, Roselle, Ill., assignor to Electro Products Laboratories, Inc., a corporation of Illinois Original No. 2,883,538, dated April 21, 1959, Serial No. 481,146, January 11, 1955. Application for reissue August 3, 1959, Serial No. 831,449

6 Claims. (Cl. 331—64)

Matter enclosed in heavy brackets [ ] appears in the original patent but forms no part of this reissue specification; matter printed in italics indicates the additions made by reissue.

This application is concerned with a sensing apparatus and more particularly with an electircal apparatus for sensing the presence of an object of a conductive material.

One feature of the invention is the provision of a sensing apparatus comprising an electrical oscillator including a tuned circuit having an inductance therein, means for normally maintaining oscillations in the oscillator, a pickup unit including at least a portion of the inductance, the oscillations of the oscillator being affected by the presence of a conductive object adjacent the pickup and in the field of the inductance and means responsive to the oscillations for deriving an indication of the presence or absence of a conductive object in the field of the inductance. Another feature is that the tuned circuit of the oscillator has a very low Q. A further feature is that provision is made for varying the sensitivity of the oscillator.

Another feature is that the tuned circuit of the oscillator comprises an inductance and distributed capacity with no lumped capacity. Yet a further feature is that the pickup unit, including the inductance is connected at the end of a multi-conductor cable and that the distributed capacity of the cable provides a major portion of the capacity of the tuned circuit.

Still a further feature is that the pickup unit includes a mountable housing of conductive material and having a bore, a sleeve of insulating material carried in the bore and extending outwardly therefrom and a coil form inside the sleeve, the inductance being wound on the coil form and outwardly of the housing.

Further features and advantages will readily be apparent from the following specification and from the drawings, in which:

Figure 4 is a schematic diagram of a modified output circuit for the apparatus;

Many types of electrical sensing apparatus are known and in use today. They are used in conjunction with counters, measuring devices, sorting equipment and metal detectors, to name only a few. Different types of sensing apparatus operate on different principles, some utilizing photo cells, others an induced voltage resulting from the variation of the flux linkages of a coil and with others depending on a capacity variation.

The present invention is concerned with a novel and improved sensing apparatus which operates on the basis of an eddy current loss and may be used with any material which is conductive.

Figure 1:
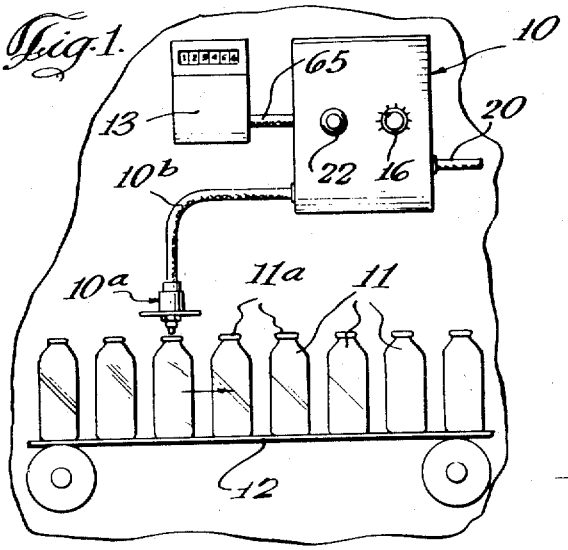
Figure 1 is a diagrammatic view showing the sensing apparatus in use as a counter.
Figure 2:
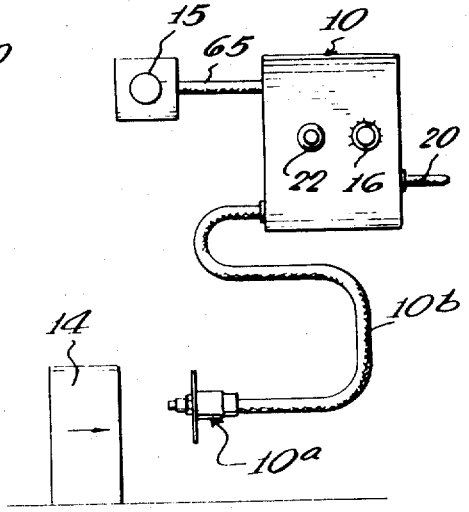
Figure 2 is a diagrammatic view showing the sensing apparatus in use as a distance measuring instrument.

Referring now to Figures 1 and 2, the electrical sensing apparatus indicated generally as 10 is shown as it may be used in two different sensing operations. In Figure 1 the apparatus is utilized to count the number of bottles 11 moving along a conveyor 12. The pickup unit 10a, which is connected to the apparatus by a cable 10b, is mounted adjacent the tops of the bottles 11. As each bottle passes the pickup unit 10a the sensing apparatus is triggered by the conductive metal caps 11a, actuating counter 13.

In Figure 2, the sensing apparatus is used as a measuring instrument, the pickup unit 10a being mounted in a desired location. At some point as an object 14 of a conductive material is moved toward pickup 10a and the sensing apparatus is triggered giving an indication as by energizing a light 15. The particular distance at which an indication is given may be varied by an adjustable control 16. The sensing apparatus for this use is initially adjusted by placing an object 14 the desired predetermined distance from the pickup 10a and setting control 16 to give the desired indication. After this, objects 14 may be moved into the desired position with great accuracy by observing indicator 15. This last embodiment of the sensing apparatus may, for example, be used in operating large machine tools to gauge the depth of a cut or the like or may be incorporated as a limit switch in automatic or semiautomatic tools.

Referring now to the schematic diagram, Figure 3, the circuit of the sensing apparatus will be described in detail. The particular values and tube types given are intended to be exemplary and are not critical unless specifically indicated otherwise.

The sensing unit may be energized by connecting leads 20 to a suitable source of power as 110 volts, A.C. The primary 21a of power transformer 21 is excited on closing of a switch 22. A half wave rectifier power supply including a selenium rectifier element 23, filter capacitors 24, 25 and 26, 20 μf. (microfarads), 30 μf. and 10 μf., respectively, and resistor 27, 5.6 KΩ, together with bleeder resistor 28, 47 KΩ, and potentiomer 29, 10 KΩ, is connected to secondary winding 21b of the power transformer. Secondary winding 21c provides a suitable heater potential for the tubes of the unit.

The basic element of the sensing apparatus is a Hartley-connected triode oscillator 30 which may utilize one-half of a 6SN7. The tuned circuit for oscillator 30 includes an inductance 31, which is in the pickup unit 10a and the distributed capacitance of the system, the major portion of which is in the pickup cable 10b. The tuned circuit is connected between grid 32 [and cathode 33] of oscillator 30 *and ground through the shield of cable 10b*. A tap 31a on the oscillator coil is *connected with cathode 33 of the oscillator*. [returned to ground through the shield of cable 10b]. Cathode resistor 34, 2,000 Ω is connected in the circuit of cathode 33 providing an operating bias for the oscillator and loading the tuned circuit. Anode 35 of oscillator 30 is connected to movable arm 29a of potentiometer 29 providing a variable operating potential for the oscillator.

The output of oscillator 30 is coupled directly from the cathode 33 thereof to the grid 37 of an amplifier 36, which may be the other half of the 6SN7. Cathode 38 of amplifier 36 is returned to ground through bias resistor 39, 1,000 Ω and capacitor 40, .05 μf. Anode 41 is connected through load resistor 42, 56 KΩ to a fixed B+ potential provided by the power supply. The oscillations produced by oscillator 30 and amplified in the amplifier 36 are coupled through capaictor 43, .0005 μf., to the grid 44 of a second amplifier 45 which may also be one-half of a 6SN7. Grid 44 of amplifier 45 is returned to ground through resistor 46, 100 KΩ while cathode 47 is connected to ground through cathode resistor 48, 1,000 Ω, and a capacitor 49, .05 μf. The anode 50 of amplifier 45 is also connected to the B+ power supply through a 56 KΩ load resistor, 51. The output of amplifier 50 is coupled through capacitor 52, .0005 μf, to a detector circuit including a 1N54 germanium diode 53, resistor 54, 100 KΩ, and capacitor 55, .0015 μf. The grid 60 of an output amplifier 61, which may also be one-half of a 6SN7, is connected to the juncture of a germanium diode 53 of capacitor 55 while cathode 62 is returned to ground through load resistor 63, 10 KΩ. Anode 64 is connected directly to the B+ power supply.

Under normal conditions, that is without a conductive object to be sensed near the pickup 10a, oscillator 30 oscillates continuously and the output thereof is amplified by amplifiers 36 and 45. These amplified oscillations are rectified by the germanium diode 53 applying a sufficient negative bias potential to the grid 60 of output amplifier 64 to cut off this stage. When a mass of conductive material is introduced into the field of oscillator coil 31 the eddy current losses occurring therein serve to damp or squelch the oscillations in oscillator 30, removing the bias from output amplifier 61 and permitting a substantial current to flow therethrough. The resulting voltage pulse obtained across cathode resistor 63 may be coupled, as through a cable 65 to a desired indicating or utilizing device. As soon as the conductive object is removed from the field of coil 31, oscillations resume in oscillator 30 and output amplifier 61 is again cut off.

Referring now more particularly to Figures 5–8, the pickup unit and oscillator coil assembly will be described in detail. The pickup unit includes an elongated, exteriorly threaded, housing 70 having a longitudinal opening or bore 70a therein. A nut 71 mating with the threaded housing permits mounting of the pickup, as by inserting it through an opening in a plate and then tightening the nut. Received within bore 70a of housing 70 is a sleeve 72 of insulating material, as a synthetic plastic, and which extends outwardly beyond the end of housing 70 about one-half inch. Inside sleeve 72 is a coil form 73 having an end portion 73a which closes the open end of the sleeve 72. Inductance 31 is wound in a narrow groove 73b provided immediately inside end portion 73a and well beyond the end of metal housing 70. In the circuit described above, coil 31 comprises 110 turns of No. 40 wire, random wound, with a center tap for connection to the pickup cable shield. The three connections to coil 31 are brought out of groove 73b through longitudinal slots 74, of which there are three, into a wide groove 75. In groove 75 the connections to coil 31 are soldered to heavy lead wires 76 and which in turn are connected to conductors of cable 10b. Both wires 76 and the leads of coil 31 are tightly wrapped in grooves 75 as by a linen thread 77 to give the assembly mechanical stability. Leads 76 are similarly conducted through longitudinal slots 78 to a second wide groove 79 where they are again wrapped with a linen thread 80.

As previously mentioned, oscillator coil 31 is tuned entirely by the distributed capacitance of the circuit, and primarily that of pickup cable 10b. The cable used in the exemplary circuit is a two conductor shielded cable ten feet long. The cable has a distributed capacitance of 25 μμf. per foot, and a total capacity of 250 μμf. The operating frequency of the oscillator 30 is preferably of the order of several hundred kilocycles per second and in the circuit which has been described is between 700 and 800 kilocycles. The Q of the tuned circuit is intentionally made extremely low, preferably less than 10, in order to provide a sensitive oscillator circuit which may be damped or squelched completely by the losses due to the presence of conductive material in the field of coil 31. The Q of the tuned circuit described is less than one.

Figure 3:
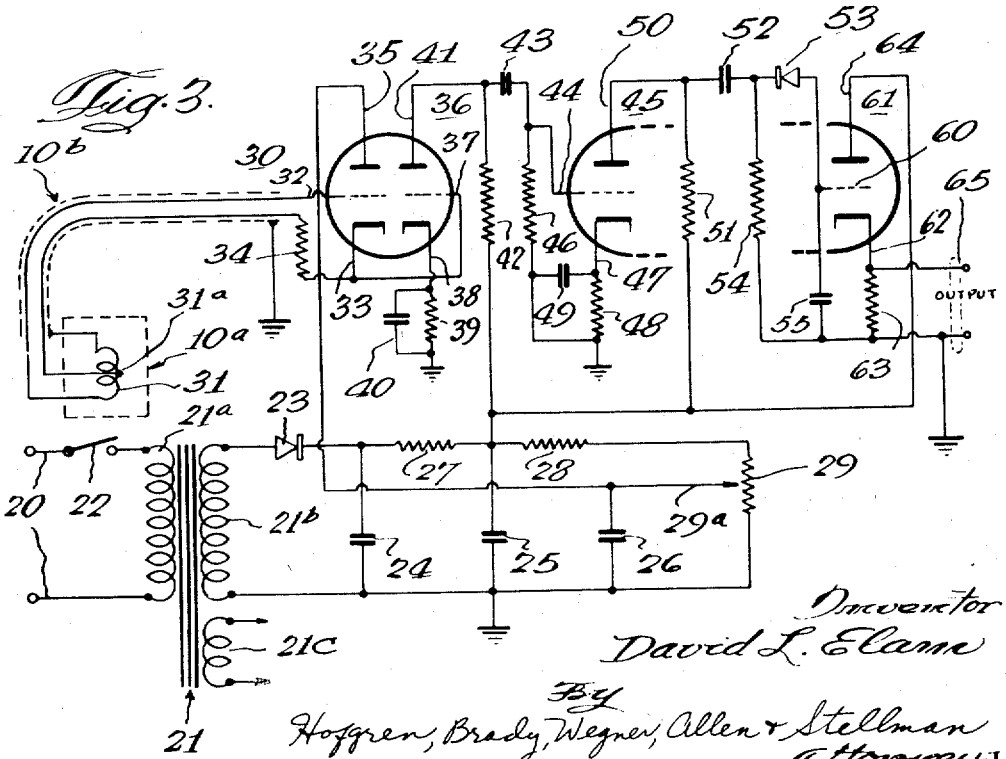
Figure 3 is a schematic diagram of the sensing apparatus.
Figure 1:
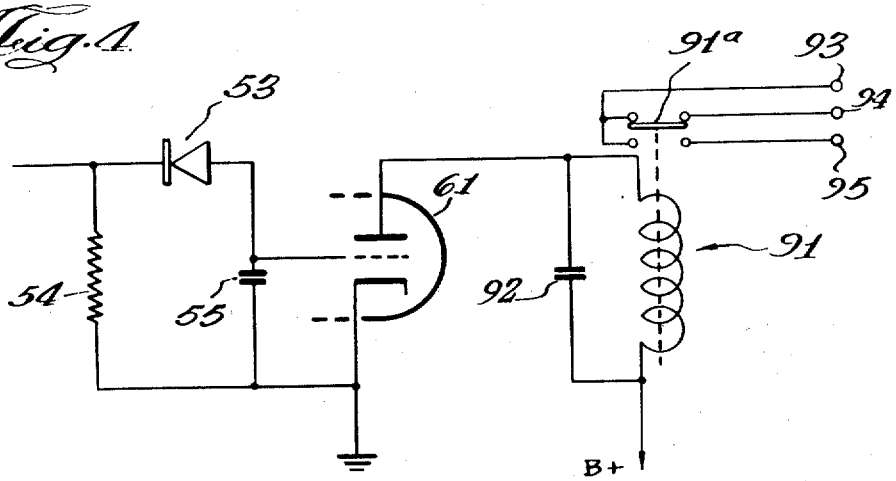
Figure 5:
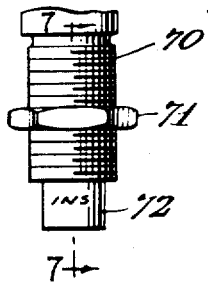
Figure 5 is a fragmentary elevational view of the pickup unit.
Figure 8:
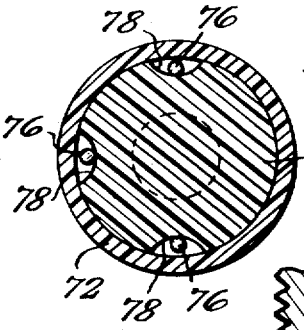
Figure 8 is a transverse sectional view taken along line 8—8 of Figure 7.
Figure 7:
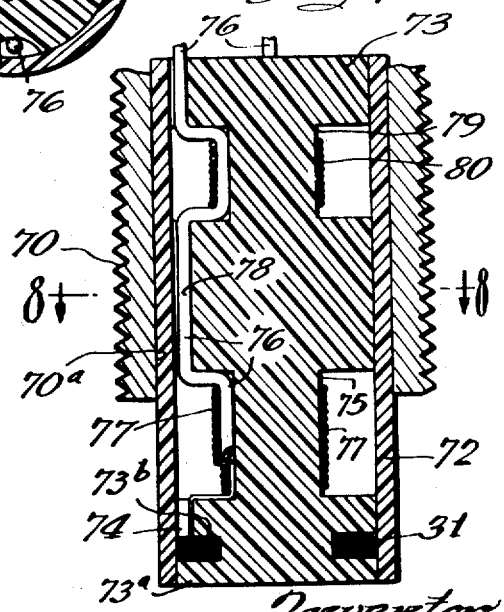
Figure 7 is an enlarged sectional view taken along line 7—7 of Figure 5.
Figure 6:
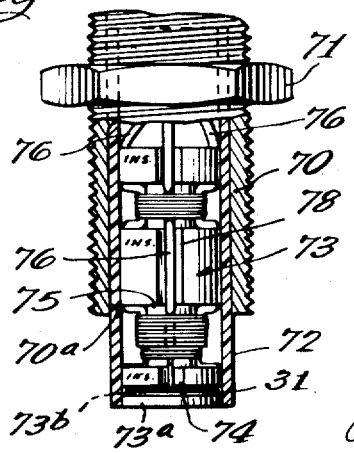
Figure 6 is an enlarged view similar to Figure 5 with a portion of the pickup unit broken away.

Figure 4 shows a modified output circuit in which a relay 91 shunted by capacitor 92 is connected in the plate circuit of output amplifier 61, replacing the cathode load resistor shown in Figure 3. The operation of the detector circuit including germanium diode 53, resistor 54 and capacitor 55 is the same as that previously described. So long as the oscillator is in normal operation, amplifier 61 is cut off and no plate current flows. The movable contact arm 91a of relay 91 is in the position shown in the drawings completing a circuit between output terminals 93 and 94. When a conductive material is introduced into the field of coil 31, squelching oscillator 30, output amplifier 61 conducts heavily, energizing relay 91 whereupon contact 91a moves downwardly completing the circuit between terminals 93 and 95. Of course, any desired circuit as a counter, control device or the like may be connected to the output terminals 93, 94 and 95 of relay 91.

The variable anode potential provided for oscillator 30 by virtue of its connection to movable arm 29a of potentiometer 29 provides a means for varying the sensitivity of the oscillator by varying an operating condition of the tube. The anode voltage for the oscillator may be adjusted as discussed above in connection with sensitivity control 16 shown in Figures 1 and 2, providing the sensitivity necessary for a particular use of the sensing apparatus. The sensitivity control permits triggering the oscillator at different distances between the pickup and conductive materials or metallic bodies. It also can be used to take care of different size masses of conducting material from a triggering standpoint.

The circuit of Figure 3 with the output taken across cathode resistor 63 of amplifier 61 provides a linear, undistorted output which is substantially a square wave in shape at frequencies up to about 1500 c.p.s. The response of the indicator circuit of Figure 4 is of course limited by the mechanical capabilities of relay 91. The use of an oscillator operating frequency in the radio frequency range improves the frequency response of the system by permitting the oscillator a faster quench and recovery time while allowing the use of small circuit components.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. Sensing apparatus of the character described, comprising: fixed radio frequency electrical oscillator including a low Q tuned circuit having an inductance therein; means for normally maintaining oscillations in said oscillator; a pickup unit including substantially all said inductance, the oscillations of said oscillator being damped by the presence of a conductive object adjacent said pickup and in the field of said inductance; and means connected to said oscillator and responsive to said oscillations for deriving an indication of the presence or absence of a conductive object in the field of said inductance.

2. Sensing apparatus of the character described in claim 1, wherein said tuned circuit has a Q of less than 10.

3. Sensing apparatus of the character described, comprising: an electrical oscillator including a tuned circuit made up of an inductance and only distributed capacity; means for normally maintaining oscillations in said oscillator; a pickup unit including substantially all said inductance, the oscillations of said oscillator being quenched by the presence of a conductive object adjacent said pickup and in the field of said inductance; and means responsive to said oscillations for deriving an indication of the presence or absence of a conductive object in the field of said inductance.

4. Sensing apparatus of the character described in claim 3, wherein said pickup unit is connected to the oscillator by an elongated multi-conductor cable and said distributed capacity is made up substantially only of the distributed capacity of said cable.

5. Sensing apparatus of the character described, comprising: an oscillator including a tube having an anode, a control grid and a cathode; a tuned circuit, including an inductance, connected between said control grid and cathode; means connected to said anode providing operating potentials for causing said tube to oscillate, the connection of said tuned circuit to said cathode including a resistive element providing degenerative feedback, the oscillations of said tube being quenched by the presence of a conductive object in the field of said inductance; and means responsive to said amplified oscillations for deriving an indication of the presence or absence of a conductive object in the field of said inductance.

6. Sensing apparatus of the character described, com prising: an electrical oscillator including a tuned circuit having an inductance; means for normally maintaining oscillations in said oscillator; a pickup unit including a mountable housing of conductive material having a bore therein, a sleeve of insulating material carried in said bore and extending outwardly therefrom, and a coil form inside said sleeve, and having a portion closing the end thereof, said inductance being wound on said form, outwardly of said housing and adjacent said portion, the oscillations of said oscillator being affected by the presence of a conductive object adjacent the pickup and in the field of the inductance; and means responsive to said oscillations for deriving an indication of the presence or absence of a conductive object in the field of said inductance.

References Cited in the file of this patent or the original patent

UNITED STATES PATENTS

| | | |
|---|---|---|
| 2,267,884 | Zuschlag | Dec. 30, 1941 |
| 2,442,805 | Gilson | June 8, 1948 |
| 2,443,125 | Weathers | June 8, 1948 |
| 2,537,065 | Lester et al. | Jan. 9, 1951 |
| 2,576,173 | Cornelius | Nov. 27, 1951 |
| 2,580,670 | Gilbert | Jan. 1, 1952 |
| 2,629,004 | Greenough | Feb. 17, 1953 |
| 2,660,704 | Harmon et al. | Nov. 24, 1953 |
| 2,671,173 | Gamersfelder | Mar. 2, 1954 |
| 2,729,785 | Keevil | Jan. 3, 1956 |
| 2,772,394 | Bradley | Nov. 27, 1956 |
| 2,774,060 | Thompson | Dec. 11, 1956 |
| 2,778,574 | Moore et al. | Jan. 22, 1957 |

OTHER REFERENCES

Journal of Scientific Instruments, vol. 21, pp. 108, 109, June 1944, "An Electronic Indicator for Liquid Separation," J. W. Broadhurst.

Handbook of Industrial Electronic Circuits, McGraw-Hill, pages 44,128–133.